US010277720B2

United States Patent
Kasher

(10) Patent No.: US 10,277,720 B2
(45) Date of Patent: Apr. 30, 2019

(54) BANDWIDTH CODING FOR CHANNEL BONDING ACCESS

(71) Applicant: INTEL IP CORPORATION, Santa Clara, CA (US)

(72) Inventor: Assaf Kasher, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/977,252

(22) Filed: Dec. 21, 2015

(65) Prior Publication Data

US 2017/0033909 A1    Feb. 2, 2017

Related U.S. Application Data

(60) Provisional application No. 62/200,020, filed on Aug. 1, 2015.

(51) Int. Cl.
| | |
|---|---|
| H04L 12/28 | (2006.01) |
| H04L 29/08 | (2006.01) |
| H04L 1/00 | (2006.01) |
| H04W 74/08 | (2009.01) |
| H04L 29/06 | (2006.01) |
| H04W 84/12 | (2009.01) |

(52) U.S. Cl.
CPC .......... *H04L 69/324* (2013.01); *H04L 1/0001* (2013.01); *H04L 1/0041* (2013.01); *H04L 1/0057* (2013.01); *H04L 1/0068* (2013.01); *H04L 1/0072* (2013.01); *H04L 67/04* (2013.01); *H04L 69/22* (2013.01); *H04W 74/0816* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,873,384 | B2 * | 10/2014 | Hart | H04L 5/0092 370/230 |
| 2008/0016426 | A1 * | 1/2008 | Li | H03M 13/01 714/755 |
| 2010/0118785 | A1 * | 5/2010 | Sugaya | H04W 74/0816 370/328 |
| 2010/0231803 | A1 * | 9/2010 | Citta | H04N 21/234327 348/723 |
| 2011/0179335 | A1 * | 7/2011 | Hong | H04L 1/0041 714/755 |
| 2015/0349857 | A1 | 12/2015 | Cordeiro et al. | |
| 2015/0373587 | A1 | 12/2015 | Josiam et al. | |
| 2016/0149590 | A1 * | 5/2016 | Bao | H03M 13/1174 714/776 |
| 2016/0316455 | A1 * | 10/2016 | Asterjadhi | H04W 72/04 |
| 2017/0202011 | A1 | 7/2017 | Trainin et al. | |

\* cited by examiner

*Primary Examiner* — Phuongchau Ba Nguyen

(57) ABSTRACT

Disclosed herein are techniques to provide an indication of bandwidth to establish a TxOP using channel bonding. An information element may be generated to include an RTS frame or a CTS frame and an indication of bandwidth in a parity portion of the information element. The indication of bandwidth may be included by using 16 bits of the parity bits of parity bytes for a PHY header of the information element.

24 Claims, 11 Drawing Sheets

BANDWIDTH CODING FOR CHANNEL BONDING ACCESS

CROSS-REFERENCE TO RELATED APPLICATION

This application claims the benefit of U.S. Provisional Application Ser. No. 62/200,020 filed Aug. 1, 2015, entitled "Bandwidth Coding for Channel Bonding Access," which application is incorporated herein by reference in its entirety.

TECHNICAL FIELD

Embodiments described herein generally relate to wireless communications and in particular to transmissions using channel bonding.

BACKGROUND

Many modern devices include wireless networking capabilities. In particular, many devices include various communication and networking abilities that provide for wireless communication. Additionally, modern devices are increasingly connected to each other, to the Internet, or to another network. To accommodate the number of devices that are wirelessly connected and the amount of data that is communicated, modern wireless communication techniques may implement channel bonding.

Wireless transmissions utilizing channel bonding use different channel access rules compared to single channel transmissions, which can result in legacy devices not being compatible with these modern transmission schemes.

DETAILED DESCRIPTION

Figure 1:
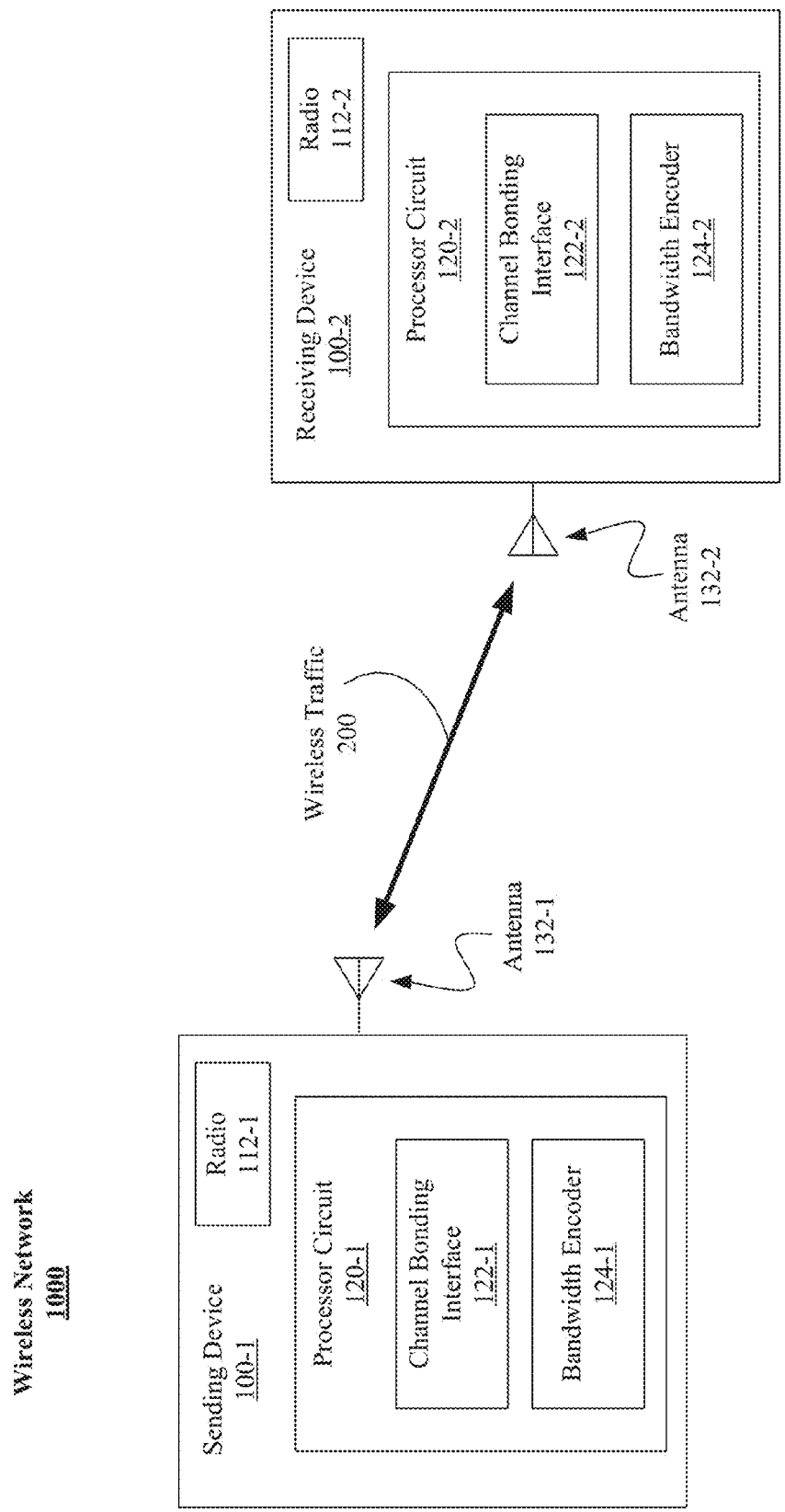
FIG. 1 illustrates an example of a wireless network.

The present disclosure is generally directed to encoding the bandwidth used for channel bonding transmission schemes to be compatible with legacy devices. For example, a wireless transmission technique may communicate a request to send (RTS) frame and a clear to send (CTS) frame over the channels to be used in the transmission opportunity (TxOP). In particular, the RTS frame may be sent over all the channels while the CTS frame may be sent over those channel that had a clear channel assessment (CCA) or a network allocation vector (NAV) while receiving the RTS frame. It is noted, however, that such a communication technique requires signaling the bandwidth in the RTS and CTS frames. In particular, the bandwidth can be indicated in the RTS and CTS frames to notify the receiving station which channels are going to be used for the TxOP. Of note, the bandwidth is indicated in the RTS and CTS frames while providing backwards compatibility for legacy devices. More specifically, legacy devices may still be able to decode the CTS and RTS frames and join a TxOP using legacy techniques while modern devices can join a TxOP using channel bonding. In particular, modern devices may signal the bandwidth to provide channel bonding for more robust communication.

It is worthy to note, the RTS and CTS frames include a physical layer (PHY) header component. Furthermore, the RTS frame, the CTS frame, and the PHY header do not include reserved bits. As such, the bandwidth cannot simply be identified by a reserved bit within the PHY header, the RTS frame or the CTS frame.

The present disclosure provides to encode an indication of the bandwidth within a portion of the parity bits for the PHY header. More specifically, with some examples, the PHY header can be encoded in a code word. Corresponding parity bits can be communicated to provide error correction for the encoded PHY header. For example, some wireless transmission techniques encode the control PHY header in a low-density parity-check code (LDPC) having a ⅓ rate coding (e.g., ¹¹⁄₃₂, or the like) having corresponding LDPC parity bytes. In some examples, the bandwidth may be indicated using a portion of (e.g., a number of bits, or the like) the LDPC parity bytes.

Accordingly, the present disclosure may provide an indication of the bandwidth without substantially interfering with legacy devices. More specifically, legacy device may still decode the PHY header. Additionally, some amount of error correction may still be provided as a portion of the LDPC parity bytes are left to provide error correction. This is explained in greater detail below.

With some examples, the present disclosure may be implemented by a wireless communication standard, such as, for example, standards promulgated by the Institute of Electrical and Electronics Engineers (IEEE). For example, the present disclosure may be implemented in a standard resulting from the next generation (NG) discussions for implementing wireless communication over 60 GHz, sometimes referred to as the NG60 working group. With some examples, the present disclosure may be implemented by a standard directed to IEEE 802.11ay, which is yet to be published.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

FIG. 1 illustrates a wireless network 1000. The network 1000 includes devices 100-$a$, where "a" is a positive integer. In particular, devices 100-1 and 100-2 are shown. However, it is to be appreciated, that any number of devices 100-$a$ may be implemented, and the number of devices depicted is merely shown at a quantity to facilitate understanding. It is worthy to note, the device 100-1 is referred to herein as the sending device while the device 100-2 is referred to as the receiving device. During operation, the sending device 100-1 can wirelessly transmit a packet to the receiving device 100-2. However, reference to the device 100-1 as the sending device and the device 100-2 as the receiving device is done for purposes of clarity only and is not intended to be limiting. For example, the device 100-2 may send a packet to the device 100-1. Examples are not limited in this context.

In general, the devices 100-*a* may be any computing device and/or communication device, such as, for example, smart phones, tablet computers, laptop computers, ultrabook computers, desktop computers, televisions, media streaming devices, game consoles, Internet connected televisions, DVD players, smart watches, wireless routers, access points, wearable devices, Internet-of-Things devices, smart appliances, or the like.

Each of the devices 100-1 and 100-2 include a radio 112-*a*. In particular, the device 100-1 is depicted including the radio 112-1 while the device 100-2 is depicted including the radio 112-2. In general, each of the radios 112-1 and 112-2 may be any radio configured to communicate using a wireless transmission scheme, such as, for example, Wi-Fi, WiGig, Bluetooth, ZigBee, or the like. In a particularly illustrative example, the radio 112-1 and the radio 112-2 may be Wi-Fi radios. Furthermore, each of the devices 100-1 and 100-2 include an antenna (or antenna array) 132-*a*. In particular, the device 100-1 is depicted including the antenna 132-1 while the device 100-2 is depicted including the antenna 132-2. The antennas 132-1 and 132-2 may be operably coupled to the radios 112-1 and 112-2, respectively.

Each of the devices 100-1 and 100-2 include a processor circuit 120-*a* operably coupled to the radio 112-*a*. In particular, the device 100-1 is depicted including the processor circuit 120-1 while the device 100-2 is depicted including the processor circuit 120-2. In some examples, the processor circuits 120-1 and 120-2 may be an application processor of the devices 100-1 and 100-2, respectively. In some examples, the processor circuits 120-1 and 120-2 may be a baseband processor of the devices 100-1 and 100-2, respectively. Each of the devices 100-1 and 100-2 may also include a channel bonding interface 122-*a* and a bandwidth encoder 124-*a*. In particular, the processor circuit 120-1 is depicted including the channel bonding interface 122-1 and the bandwidth encoder 124-1 while the processor circuit 120-2 is depicted including the channel bonding interface 122-2 and the bandwidth encoder 124-2.

In general, the channel bonding interfaces 122-1 and 122-2 and the bandwidth encoders 124-1 and 124-2 may comprise programming, functions, logic, circuitry, parameters, and/or other information operative to implement particular capabilities for the devices 100-1 and/or 100-2. In some examples, the channel bonding interface 122-1 and the bandwidth encoder 124-1 may be executable by the processing circuit 120-1 while the channel bonding interface 122-2 and the bandwidth encoder 124-2 may be executable by the processing circuit 120-2. Furthermore, in some examples, the channel bonding interfaces 122-1 and 122-2 as well as the bandwidth encoders 124-1 and 124-2 may be executed below an application layer (not shown). For example, the channel bonding interfaces 122-1 and 122-2 as well as the bandwidth encoders 124-1 and 124-2 may be executed on top of the PHY layer, but below the application layer.

During operation, the devices 100-1 and 100-2 may communicate signals, depicted as wireless traffic 200, including indications of intent to communicate over various channels. For example, the devices 100-1 and 100-2 may communicate various RTS frames and/or CTS frames to establish a TxOP. In particular, the devices 100-1 and 100-2 may communicate RTS frames and/or CTS frames including an indication of the bandwidth to be used for the TxOP.

As a specific example, the channel bonding interface 122-1 may send (e.g., via the radio 112-1 and antenna 132-1, or the like) signals over various channels within a wireless spectrum to include an indication to communicate over these channels. For example, the channel bonding interface 122-1 may send RTS frames (e.g., as wireless traffic 200, or the like) over multiple channels in the 60 GHz wireless spectrum. It is important to note, that the channel bonding interface 122-1 may send the RTS frames based on CCA and/or NAV. More specifically, the channels may be selected based whether current CCA and/or NAV indications allow communication on those channels.

The channel bonding interface 122-2 may receive these RTS frames and send a number of CTS frames (e.g., via the radio 112-2 and the antenna 132-2, or the like) over a number of the channels over which the RTS frames were received. For example, the channel bonding interface 122-2 may send CTS frame(s) (e.g., as wireless traffic 200, or the like) over ones of the channels on which it received RTS frames to establish a TxOP between the device 100-1 and the device 100-2. Subsequently, the devices 100-1 and 100-2 can establish a TxOP over the channels on which the CTS frames were communicated.

The bandwidth encoders 124-1 and 124-2 may encode an indication of the bandwidth (e.g., channels, or the like) to use for establishing the TxOP with channel bonding. In particular, the bandwidth encoders 124-1 and 124-2 may indicate a number of channels to use to communicate (e.g., over wireless traffic 200, or the like) using a channel bonding technique for the TxOP. The bandwidth encoders 124-1 and 124-2 may encode the bandwidth in a portion of the parity bytes corresponding to the PHY header of the RTS and CTS frames. It is noted, that indication of the bandwidth to be used may provide a more robust indication of the bandwidth to be used for the TxOP as energy detection may not be reliable to determine if there was transmission in a particular channel. Additionally, use of the RTS and CTS frames provides support for legacy devices. In particular, the legacy devices may still receive and decode the RTS and CTS frames. As such, legacy devices may update their NAV based on the RTS and CTS frames.

Figure 2:
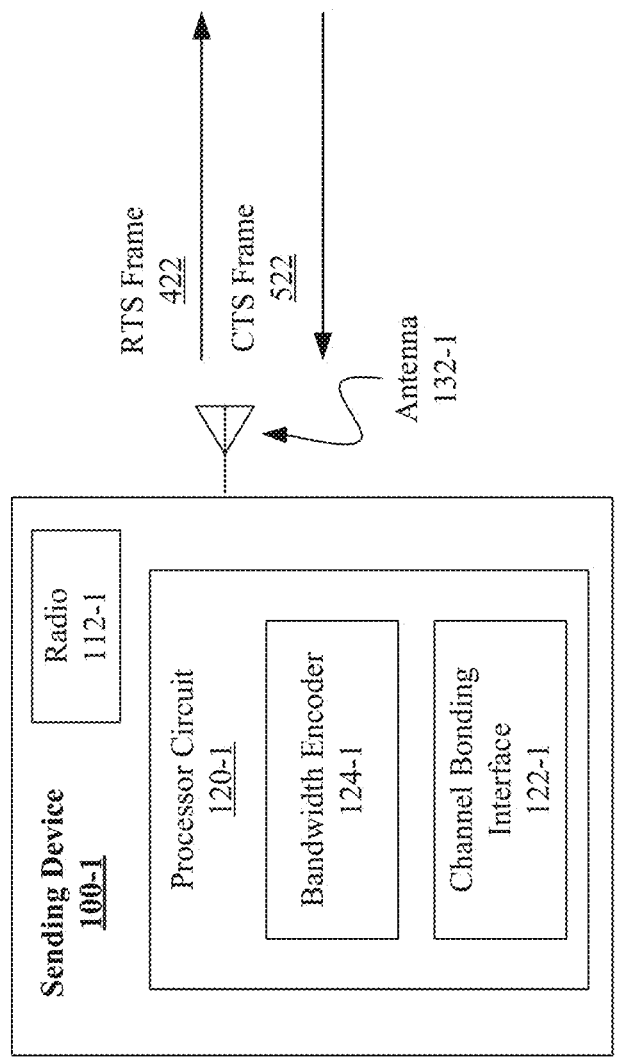
FIGS. 2-3 each illustrate an examples of a portion of the wireless network of FIG. 1.
Figure 3:
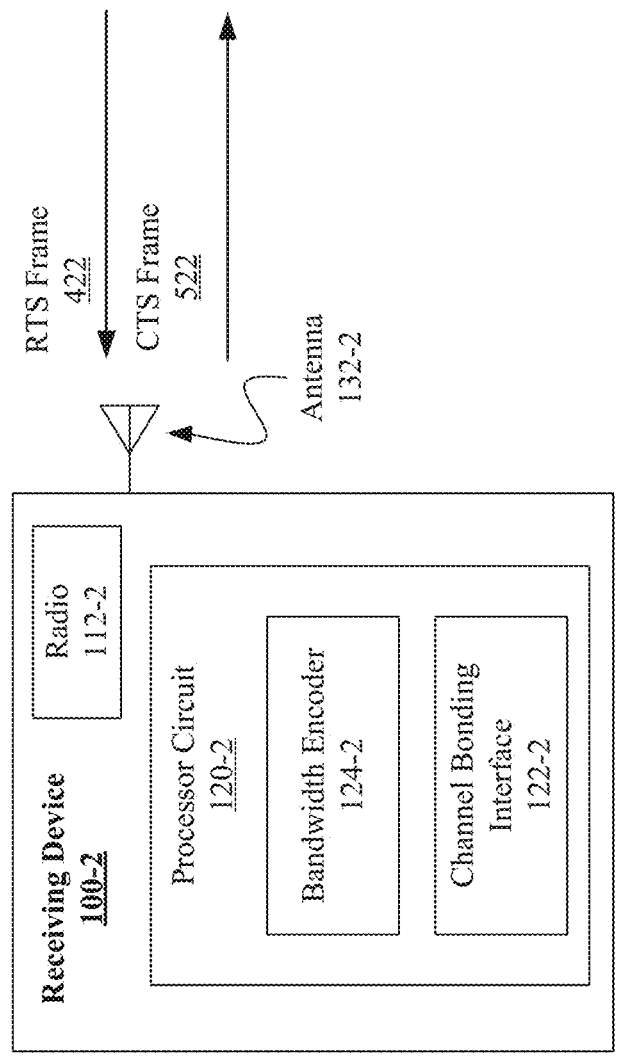

FIGS. 2-3 each illustrate block diagrams of a portion of the wireless network 1000 FIG. 1. In particular, each of these figures depicts aspects of the operation of the devices 100-1 and 100-2 in establishing a TxOP and providing an indication of bandwidth to use for communicating during the TxOP using a channel bonding technique. More specifically, FIG. 2 depicts aspects of the operation of the device 100-1 in encoding bandwidth information in a portion of the PHY header parity bytes while FIG. 3 aspects of the operation of the device 100-2 in encoding bandwidth information in a portion of the PHY header parity bytes.

Turning more particularly to FIG. 2, the device 100-1 is depicted, including the radio 112-1, the antenna 132-1, and the processor circuit 120-1. The processor circuit 120-1 includes the channel bonding interface 122-1 and the bandwidth encoder 124-1. During operation, the bandwidth encoder 124-1 may add an indication of bandwidth to use for channel bonding during a TxOP to a portion of the parity bytes of the PHY header of an RTS frame 422. An example RTS frame 422, including the PHY header and parity bytes is given with respect to FIG. 4. In general, however, the PHY header may be encoded using a variety of encoding techniques.

For example, in some implementations, the bandwidth encoder 124-1 can encode the PHY header using a ¾ rate LDPC matrix. It is noted, that with a ¾ rate LDPC matrix, there are 168 parity bits in the code word, which necessitates 21 bytes to indicate the code word. With some embodiments, the code rate is below ½, corresponding to a maximum of 21 bytes per code word. In some examples, the PHY header is composed of 5 bytes with a payload portion of 6 bytes. As such, the effective code rate for the header code word is 11/32≈1/3. The present disclosure provides to use 2 bytes (e.g., 16 bits) from the parity bytes of the PHY header code word (e.g., the LDPC code word, or the like) to indicate the bandwidth.

In general, the bandwidth encoder 124-1 can encode an indication of the bandwidth in any of the parity bytes. With some examples, the bandwidth encoder 124-1 encodes an indication of the bandwidth in the first 2 parity bytes of the code word. It is worthy to note, that a minimal loss in fidelity may result from shortening the code word. In particular, with some examples, the degradation of the packet error rate may be less than 0.2 decibels (dB).

Figure 4:
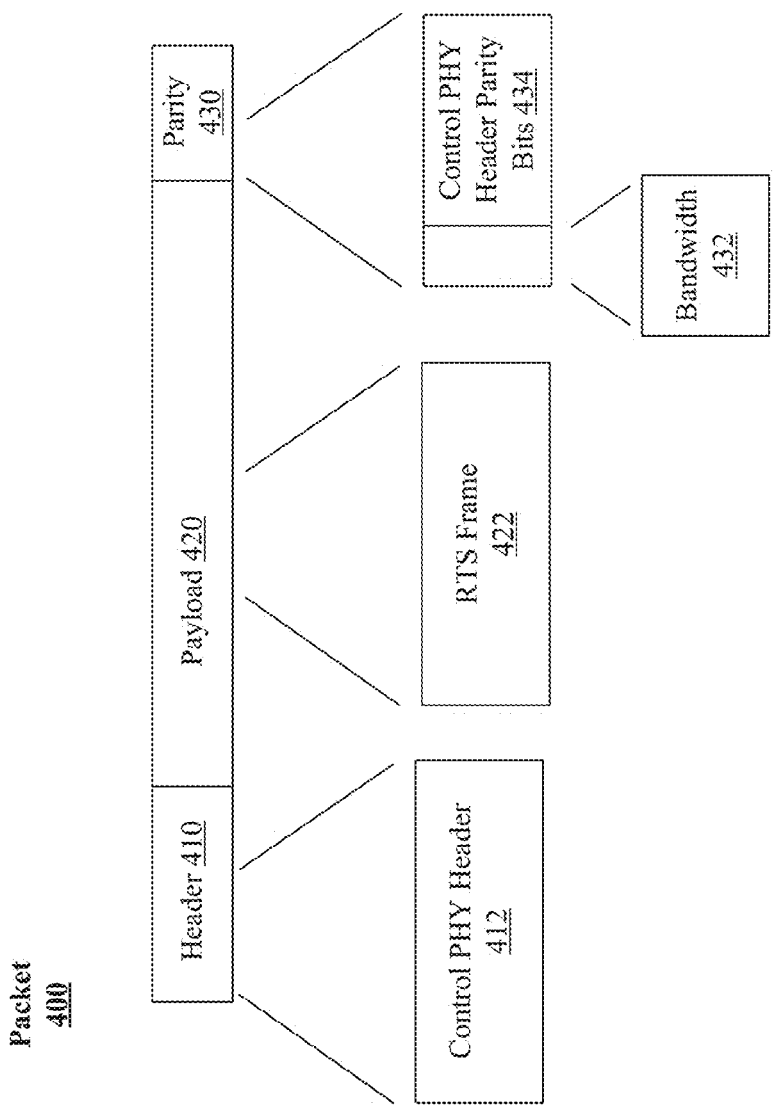
FIGS. 4-5 each illustrate an example of a packet.

In some examples, the bandwidth encoder 124-1 may encode an indication of the bandwidth and send the indication outside the data of the LDPC code word for the RTS frame 422 (e.g., refer to FIG. 4). In some implementations, the bandwidth encoder 124-1 can provide an indication of the bandwidth with 4 bits, for example, in the case of non-overlapping channel bonding for up to 3 channels. In some implementations, the bandwidth encoder 124-1 can provide an indication of the bandwidth with 5 bits, for example, in the case of overlapping channel bonding.

In general, the bandwidth encoder 122-1 can encode an indication of the bandwidth within 2 bytes (e.g., 16 or less bits, or the like) of the LDPC parity bytes described above using various encoding schemes. For example, the bandwidth encoder 124-1 may encode an indication of the bandwidth using a punctured Hadamard code. It is worthy to note, the Hadamard code is a block code having parameters (L, k, D), where L equals the length of the code word, k equals the number of message bits, and D equals the Hamming distance. In particular, $L=2^k$ and $D=2^{k-1}$. As such, Hadamard code has the parameters $(2^k, k, 2^{k-1})$. Punctured Hadamard code has parameters $(2^{k-1}, k, 2^{k-2})$. Hadamard code uses the rows of Hadamard matrix as the code words. With some examples, the matrix corresponding to Hadamard code will be 16×16, as such, k=4. For punctured Hadamard code, k=5, which may be more efficient and may use the rows of the Hadamard matrix and their negation as the code words, resulting in 32 possible code words with a minimum Hamming distance of 8. It is important to note, that all the distances are of 8 except for the distance from the negated row which is 16.

In some examples, the bandwidth encoder 124-1 may encode an indication of the bandwidth using Hadamard or punctured Hadamard code as described herein. As a specific example, the bandwidth encoder 124-1 can encode an indication of the bandwidth using the following tables. Table 1 may be used to encode an indication of the bandwidth for non-overlapping channels while Table 2 may be used to encode an indication of the bandwidth for overlapping channels.

TABLE 1

Example Indication for Non-Overlapping Channels

| Field Value | Interpretation |
| --- | --- |
| 0 | Only one channel is used. |
| 1 | Channels 1 and 2 are used. Channel 1 is primary. |
| 2 | Channels 1 and 2 are used. Channel 2 is primary. |
| 3 | Channels 3 and 4 are used. Channel 3 is primary. |
| 4 | Channels 3 and 4 are used. Channel 4 is primary. |
| 5 | Channels 5 and 6 are used. Channel 5 is primary. |
| 6 | Channels 5 and 6 are used. Channel 6 is primary. |
| 7 | Channels 7 and 8 are used. Channel 7 is primary. |
| 8 | Channels 7 and 8 are used. Channel 8 is primary. |
| 9 | Channels 1, 2 and 3 are used. Channel 1 is primary. |
| 10 | Channels 1, 2 and 3 are used. Channel 2 is primary. |
| 11 | Channels 1, 2 and 3 are used. Channel 3 is primary. |
| 12 | Channels 5, 6 and 7 are used. Channel 5 is primary. |
| 13 | Channels 5, 6 and 7 are used. Channel 6 is primary. |
| 14 | Channels 5, 6 and 7 are used. Channel 7 is primary. |
| 15 | Channels 1, 2, 3 and 4 are used. Channel 1 is primary. |
| 16 | Channels 1, 2, 3 and 4 are used. Channel 2 is primary. |
| 17 | Channels 1, 2, 3 and 4 are used. Channel 3 is primary. |
| 18 | Channels 1, 2, 3 and 4 are used. Channel 4 is primary. |
| 19 | Channels 5, 6, 7 and 8 are used. Channel 5 is primary. |
| 20 | Channels 5, 6, 7 and 8 are used. Channel 6 is primary. |
| 21 | Channels 5, 6, 7 and 8 are used. Channel 7 is primary. |
| 22 | Channels 5, 6, 7 and 8 are used. Channel 8 is primary. |

TABLE 2

Example Indication for Overlapping Channels

| Field Value | Interpretation |
| --- | --- |
| 0 | Channels 1 and 2 are used. Channel 1 is primary. |
| 1 | Channels 1 and 2 are used. Channel 2 is primary. |
| 2 | Channels 2 and 3 are used. Channel 2 is primary. |
| 3 | Channels 2 and 3 are used. Channel 3 is primary. |
| 4 | Channels 3 and 4 are used. Channel 3 is primary. |
| 5 | Channels 3 and 4 are used. Channel 4 is primary. |
| 6 | Channels 4 and 5 are used. Channel 4 is primary. |
| 7 | Channels 4 and 5 are used. Channel 5 is primary. |
| 8 | Channels 5 and 6 are used. Channel 5 is primary. |
| 9 | Channels 5 and 6 are used. Channel 6 is primary. |
| 10 | Channels 6 and 7 are used. Channel 6 is primary. |
| 11 | Channels 6 and 7 are used. Channel 7 is |

TABLE 2-continued

Example Indication for Overlapping Channels

| Field Value | Interpretation |
|---|---|
|  | primary. |
| 12 | Channels 7 and 8 are used. Channel 7 is primary. |
| 13 | Channels 7 and 8 are used. Channel 8 is primary. |
| 14 | Channels 1, 2 and 3 are used. Channel 1 is primary. |
| 15 | Channels 1, 2 and 3 are used. Channel 2 is primary. |
| 16 | Channels 1, 2 and 3 are used. Channel 3 is primary. |
| 17 | Channels 2, 3 and 4 are used. Channel 2 is primary. |
| 18 | Channels 2, 3 and 4 are used. Channel 3 is primary. |
| 19 | Channels 2, 3 and 4 are used. Channel 4 is primary. |
| 20 | Channels 3, 4 and 5 are used. Channel 3 is primary. |
| 21 | Channels 3, 4 and 5 are used. Channel 4 is primary. |
| 22 | Channels 3, 4 and 5 are used. Channel 5 is primary. |
| 23 | Channels 4, 5 and 6 are used. Channel 4 is primary. |
| 24 | Channels 4, 5 and 6 are used. Channel 5 is primary. |
| 25 | Channels 4, 5 and 6 are used. Channel 6 is primary. |
| 26 | Channels 5, 6 and 7 are used. Channel 5 is primary. |
| 27 | Channels 5, 6 and 7 are used. Channel 6 is primary. |
| 28 | Channels 5, 6 and 7 are used. Channel 7 is primary. |
| 29 | Channels 6, 7 and 8 are used. Channel 6 is primary. |
| 30 | Channels 6, 7 and 8 are used. Channel 7 is primary. |
| 31 | Channels 6, 7 and 8 are used. Channel 8 is primary. |

It is important to note, that the example encoding schemes provided with respect to Tables 1 and 2 are given for example only and not to be limiting. In particular, the values and their interpretation can be modified without departing from the scope of the disclosure. Furthermore, the encoding schemes described by these tables may be extended, for example, boding of more than three overlapping channels may be indicated by dropping the indication of the primary channel.

The device 100-1 can send the RTS frame 422, including an indication of the bandwidth to use for channel bonding during a TxOP via the radio 112-1 and the antenna 132-1. Additionally, the device 100-1 can receive a CTS frame 522. In particular, the device 100-1 can receive the CTS frame 522 from a device (e.g., the device 100-2, or the like) in response to the RTS frame 422. An example of the CTS frame 522 is given with respect to FIG. 5.

In some examples, the bandwidth encoder 124-1 can decode the indication of the bandwidth from the CTS frame 522. In particular, the bandwidth encoders 124-1 can correlate the possible code words to the received indication of the bandwidth and select the one with the highest correlation. With some examples, the correlation is checked for only the first 16 rows of the code, and the correlation with the negative code word is derived. In some examples, the bandwidth encoder 124-1 correlate the code words using a Fast Walsh Hadamard Transform. In some examples, the bandwidth encoder 124-1 correlate the code words through multiplication by a 16×16 Hadamard matrix.

Subsequently, the channel bonding interface can implement channel bonding during a TxOP based on the bandwidth indicated in the RTS frame 422 and/or the CTS frame 522. This is explained in greater detail below, for example, with respect to FIG. 6

Turning more particularly to FIG. 3, the device 100-2 is depicted, including the radio 112-2, the antenna 132-2, and the processor circuit 120-2. The processor circuit 120-2 includes the channel bonding interface 122-2 and the bandwidth encoder 124-2. During operation, the bandwidth encoder 124-2 may add an indication of bandwidth to use for channel bonding during a TxOP to a portion of the parity bytes of the PHY header of the CTS frame 522.

More specifically, during operation the device 100-2 may receive the RTS frame 422 (e.g., from the device 100-1, or the like). The device 100-2 may send the CTS frame 522 in response to receiving the RTS frame 422. The bandwidth encoder 124-2 may encode an indication of the bandwidth to use for channel bonding in the PHY header of the CTS frame.

In general, the bandwidth encoder 124-2 can encode an indication of the bandwidth in any of the parity bytes. In some examples, the bandwidth encoder 124-2 may encode an indication of the bandwidth and send the indication outside the data of the LDPC code word for the CTS frame 522 (e.g., refer to FIG. 5). In some implementations, the bandwidth encoder 124-2 can provide an indication of the bandwidth with 4 bits, for example, in the case of non-overlapping channel bonding for up to 3 channels. In some implementations, the bandwidth encoder 124-2 can provide an indication of the bandwidth with 5 bits, for example, in the case of overlapping channel bonding.

In general, the bandwidth encoder 122-2 can encode an indication of the bandwidth within 2 bytes (e.g., 16 or less bits, or the like) of the LDPC parity bytes described above using various encoding schemes. For example, the bandwidth encoder 124-2 may encode an indication of the bandwidth using a punctured Hadamard code, for example, as described above in conjunction with FIG. 2. As a specific example, the bandwidth encoder 124-2 can encode an indication of the bandwidth using Tables 1 and 2 discussed above.

Figure 5:
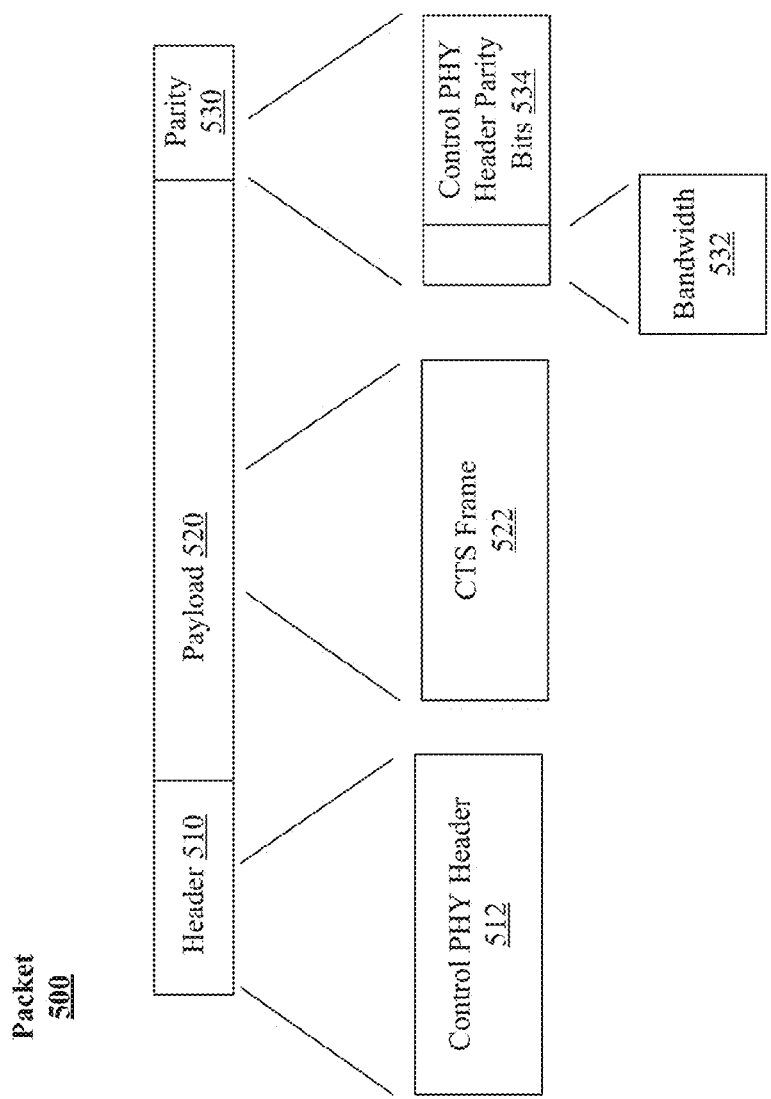

FIGS. 4-5 each illustrate an example packet. In particular, FIG. 4 illustrates an example packet 400 that can include the RTS frame 422 while FIG. 5 illustrates an example packet 500 that can include the CTS frame 522. It is worthy to note, that the portions of the packets 400 and 500 discussed herein can be contiguously located (e.g., as depicted) or not be contiguously location. Examples are not limited in this context. It is worthy to note, that the term "packet" is used herein in it's broadest sense to indicate data organized to be communicated over a wireless network, such as, for example, as wireless traffic 200 in the network 1000 of FIG. 1. In particular, the term "packet," as used herein, may by analogous to, synonymous with, and/or interpreted to include, an information element, a bit stream, a data structure, or the like.

Turning more specifically to FIG. 4, the packet 400 is depicted. The packet 400 may include a header portion 410, a payload portion 420, and a parity portion 430. The header portion 410 may include a PHY header 412. The payload portion 420 may include the RTS frame 422. The parity portion 430 may include an indication of the bandwidth 432 and PHY header parity bits 434.

Turning more specifically to FIG. 5, the packet 500 is depicted. The packet 500 may include a header portion 510, a payload portion 520, and a parity portion 530. The header portion 510 may include a PHY header 512. The payload portion 520 may include the CTS frame 522. The parity portion 530 may include an indication of the bandwidth 532 and PHY header parity bits 534.

It is worthy to note, the packets 400 and/or 500 may be formatted according to a variety of wireless communication standards, such as, for example, the standards referenced above.

Figure 6:
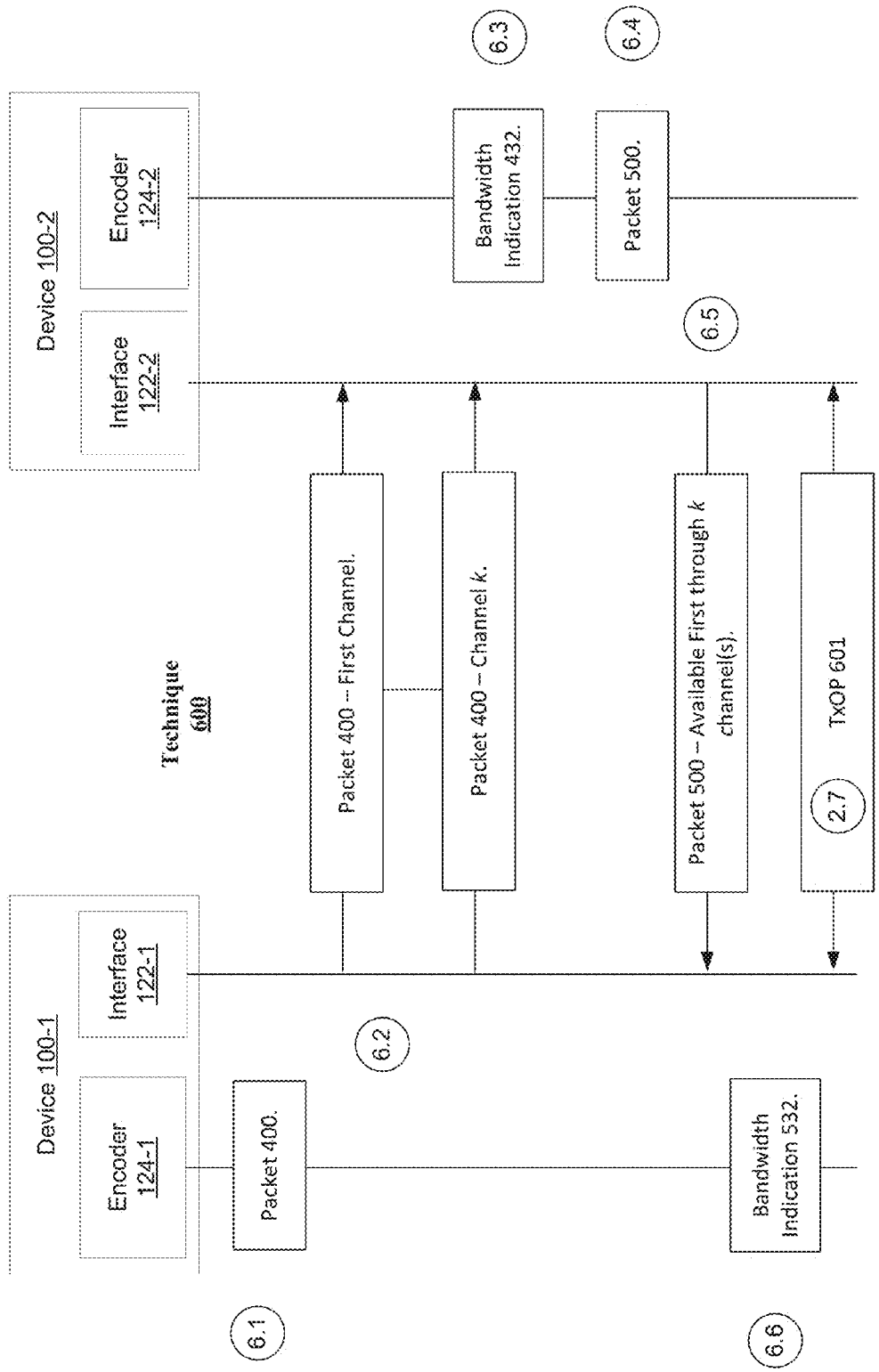
FIG. 6 illustrates an example of a technique.

FIG. 6 illustrates a technique to establish a TxOP and provide an indication of bandwidth to use for channel bonding according to at least one example of the present disclosure. In particular, this figure illustrates a technique 600, that can be implemented by devices in a wireless network, such as, the devices 100-1 and 100-2 in the network 1000 depicted in FIG. 1. It is noted, that the technique 600 is described with respect to the network 1000 as well as the devices 100-1 and 100-2. Furthermore, the technique 600 is described with respect to the packets 400 and 500. This is done for purposes of clarity and not to be limiting. In particular, the technique 600 can be implemented by devices having different configurations that that depicted in FIG. 1. Examples are not limited in these contexts.

The technique 600 may include actions 6.1 to 6.7. In general, actions 6.1 to 6.7 may be implemented by logic, at least a portion of which is in hardware, to provide an indication of bandwidth for channel bonding during a TxOP as described herein. The technique 600 may begin with action 6.1.

At action 6.1, the bandwidth encoder 124-1 may encode an indication of the bandwidth to use for channel bonding in the packet 400. For example, the bandwidth encoder 124-1 can encode an indication of the bandwidth 432 in a parity portion 430 of the packet 400. In particular, at block 6.1, the bandwidth encoder 124-1 may generate the packet 400 including the PHY header 412, the RTS frame 422, an indication of the bandwidth 432 and the PHY header parity bytes 434. With some examples, the indication of the bandwidth 432 can be generated based on a Hadamard code or a punctured Hadamard code as described herein.

Continuing to action 6.2, the channel bonding interface 122-1 may send the packet 400 over one or more channels. For example, this figure depicts the channel bonding interface 122-1 sending the packet 400, including the RTS frame 422 and the bandwidth indication 432 over a first through k channels, where k is a positive integer greater than 1. It is noted, that the first channel does not necessarily equal channel 1 for a particular bandwidth and is merely used to distinguish between channels over which the packet is sent. Furthermore, the first through k channels need not be contiguous.

Continuing to action 6.3, the bandwidth encoder 124-2 may decode the bandwidth information 432 from the parity portion 430 of the packet 400.

Continuing to action 6.4, the bandwidth encoder 124-2 may encode an indication of the bandwidth to use for channel bonding in the packet 500. For example, the bandwidth encoder 124-2 can encode an indication of the bandwidth 532 in a parity portion 530 of the packet 500. In particular, at block 6.4, the bandwidth encoder 124-2 may generate the packet 500 including the PHY header 512, the CTS frame 522, an indication of the bandwidth 532 and the PHY header parity bytes 534. With some examples, the indication of the bandwidth 532 can be generated based on a Hadamard code or a punctured Hadamard code as described herein.

Continuing to action 6.5, the channel bonding interface 122-2 may send the packet 500 over one or more channels. More specifically, the channel bonding interface 122-2 can send the packet 500 (e.g., the CTS frame 522) over ones of the channels on which it received the packet 400 (e.g., the RTS frame 422). It is worthy to note, the channel bonding interface 122-2 can send the packet 500 over ones of the first through k channels based on a NAV for the network 1000 and/or whether a CCA is active for a particular channel.

Continuing to action 6.6, the bandwidth encoder 124-1 may decode the bandwidth information 532 from the parity portion 530 of the packet 500.

Continuing to block 6.7, the channel bonding interfaces 122-1 and 122-2 may establish a TxOP 601 based on the bandwidth information 432 and 532. Said differently, the devices 100-1 and 100-2 may communicate (e.g., send signals over the TxOP 601) using a channel bonding scheme where the bandwidth (e.g., channels, or the like) for the channel bonding scheme are indicated in the bandwidth indications 432 and 532.

Figure 7:
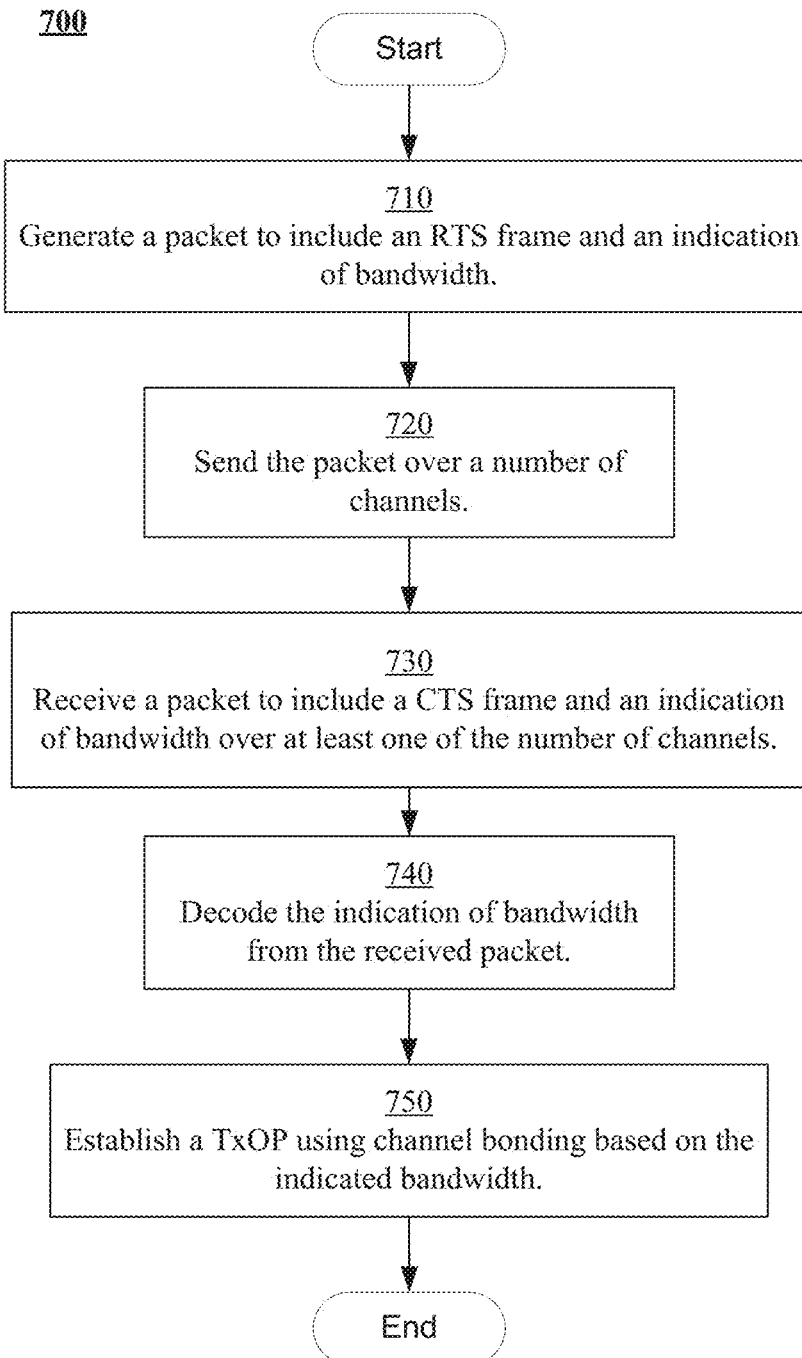
FIGS. 7-8 each illustrate an example logic flow.
Figure 8:
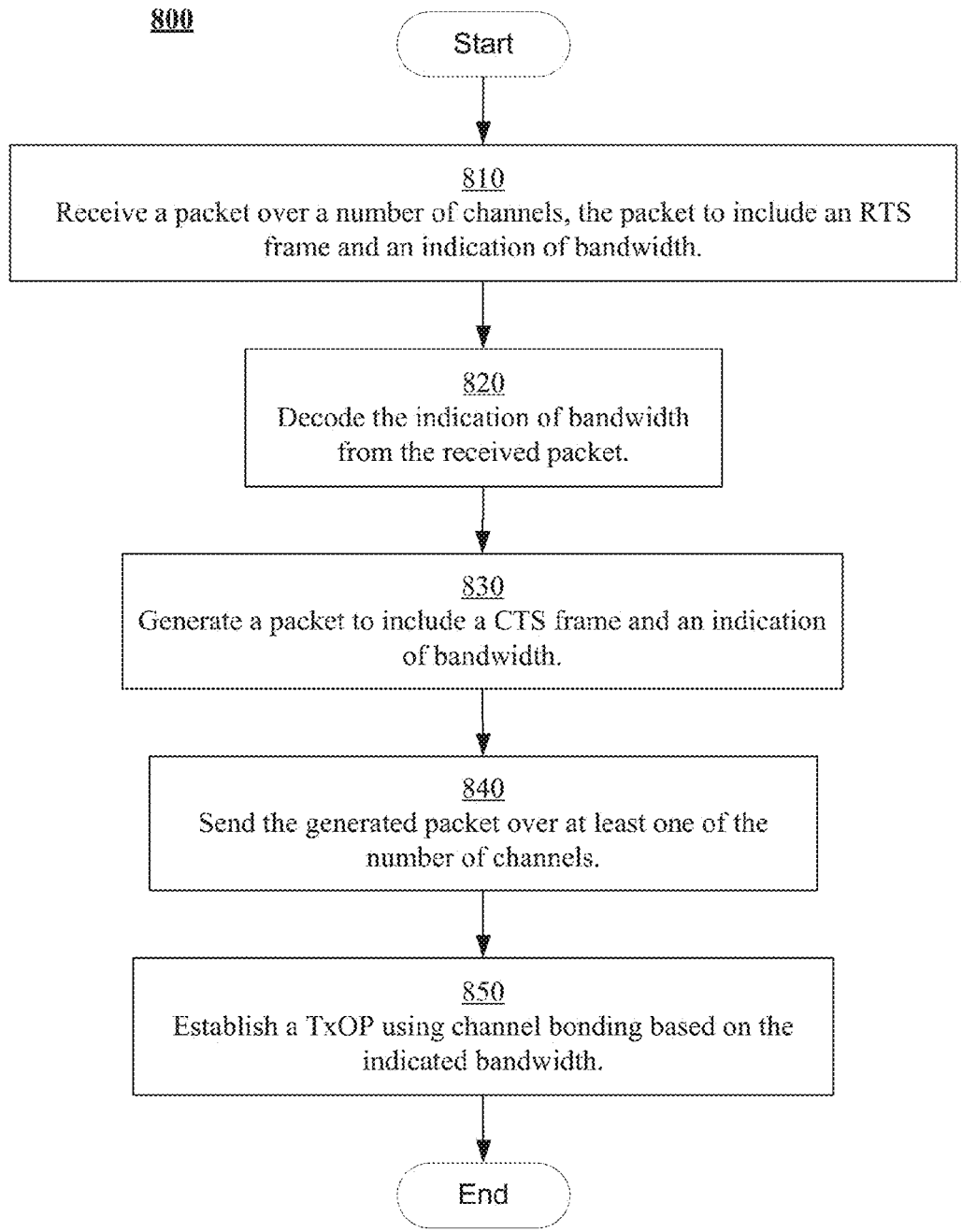

FIGS. 7-8 each illustrate an example logic flow representative of at least some operations implemented by one or more logic, features, or devices described herein. In general, the logic flows may be representative of some or all of the operations executed by logic and/or features of the devices 100-1 and/or 100-2 of the network 1000. In particular, FIG. 7 illustrates a logic flow 700, which may be representative of operations performed by the sending device 100-1 in providing an indication of bandwidth using the techniques described herein while FIG. 8 illustrates a logic flow 800, which may be representative of operations performed by the receiving device 100-2 in providing an indication of bandwidth using the techniques described herein. It is to be appreciated, that although the example logic flows are described with reference to the network 1000 of FIG. 1, this is not intended to be limiting and is merely done for clarity of presentation.

Turning more specifically to FIG. 7 and the logic flow 700. The logic flow 700 may begin at block 710. At block 710 "generate a packet to include an RTS frame and an indication of bandwidth," the bandwidth encoder 124-1 may generate a packet to include an RTS frame and an indication of bandwidth to use for channel bonding. For example, the bandwidth encoder 124-1 may generate the packet 400 to include the RTS frame 422 and the indication of bandwidth 432.

Continuing to block 720 "send the packet over a number of channels," the channel bonding interface 122-1 may send the packet 400 over a number of channels. For example, the channel bonding interface 122-1 may send the packet 400 over open channels (e.g., the first through k channels, or the like) to which a TxOP can be established.

Continuing to block 730 "receive a packet to include a CTS frame and an indication of bandwidth over at least one of the number of channels," the channel bonding interface 122-1 may receive a packet to include a CTS frame and an indication of bandwidth to use for channel bonding. For example, the channel bonding interface 122-1 may receive the packet 500 including the CTS frame 522 and the bandwidth indication 532.

Continuing to block 740 "decode the indication of bandwidth from the received packet," the encoder 124-1 may decode the bandwidth from the packet received at block 730 (e.g., the packet 500).

Continuing to block 750 "establish a TxOP using channel bonding based on the indicated bandwidth," the channel bonding interface 122-1 may establish a TxOP (e.g., the TxOP 601, or the like) using channel bonding based on the indicated bandwidth (e.g., the bandwidth indicated in the bandwidth indication 532, or the like).

Turning more specifically to FIG. 8 and the logic flow 800. The logic flow 800 may begin at block 810. At block 810 "receive a packet over a number of channels, the packet to include an RTS frame and an indication of bandwidth," the channel bonding interface 122-2 may receive a packet to include an RTS frame and an indication of bandwidth. For example, the interface 122-2 may receive the packet 400 including the RTS frame 422 and the indication of bandwidth 432.

Continuing to block 820 "decode the indication of bandwidth from the received packet," the bandwidth encoder 124-2 may decode the bandwidth from the received packet.

Continuing to block 830 "generate a packet to include a CTS frame and an indication of bandwidth," the bandwidth encoder 124-2 may generate a packet to include a CTS frame and an indication of bandwidth. For example, the bandwidth encoder 124-2 may generate the packet 500 to include the CTS frame 522 and the indication of bandwidth 532.

Continuing to block 840 "send the generated packet over at least one of the number of channels," the channel bonding interface 122-2 may send the generated packet (e.g., the packet 500, or the like) over one or more channels.

Continuing to block 850 "establish a TxOP using channel bonding based on the indicated bandwidth," the channel bonding interface 122-2 may establish a TxOP (e.g., the TxOP 601, or the like) using channel bonding based on the indicated bandwidth (e.g., the bandwidth indicated in the bandwidth indication 532, or the like).

Figure 9:
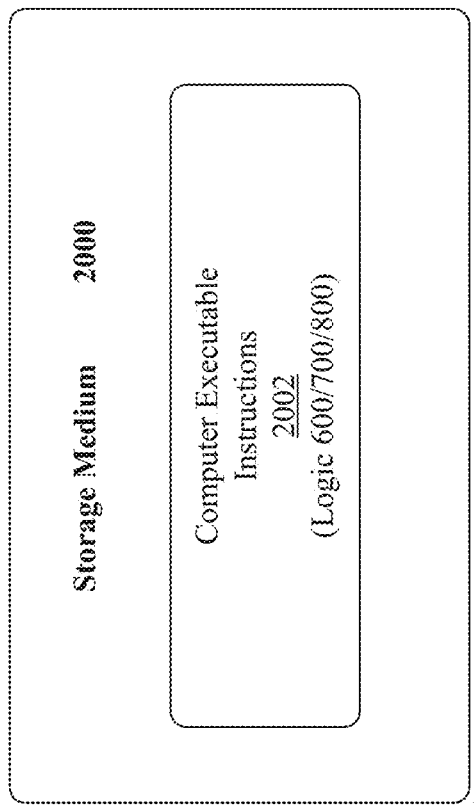
FIG. 9 illustrates one embodiment of a storage medium.

FIG. 9 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 600. In some examples, the storage medium 2000 may store various types of computer executable instructions to implement logic flow 700. In some examples, the storage medium 2000 may store various types of computer executable instructions to implement acts associated with at least part of the technique 800.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
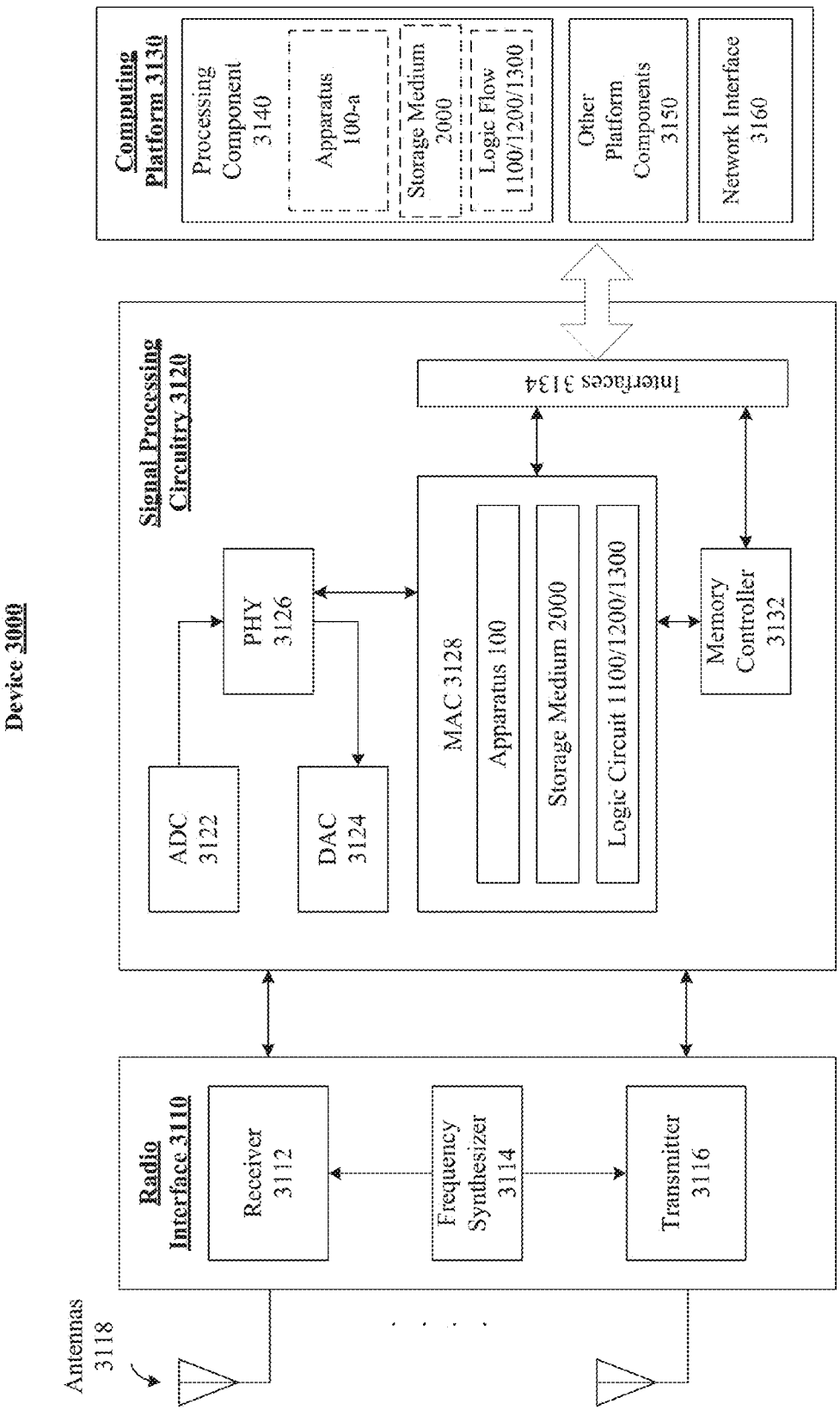
FIG. 10 illustrates one embodiment of a device.

FIG. 10 illustrates an embodiment of a device 3000. In some examples, device 3000 may be configured or arranged for wireless communications in a network such that the network 1000 shown in FIG. 1. In some examples, one of the devices 100-a may be implemented in the device 3000. For example, the device 3000 may implement the device as apparatus 100-a. Additionally, the device 3000 may implement storage medium 2000 and/or a logic circuit 600/700/800. The logic circuits may include physical circuits to perform operations described for the apparatus 100-a, storage medium 2000, technique 600, logic flow 700, and/or at least a portion of the logic flow 800. As shown in this figure, device 3000 may include a radio interface 3110, baseband circuitry 3120, and computing platform 3130, although examples are not limited to this configuration.

The device 3000 may implement some or all of the structure and/or operations for the apparatus 100-a, the storage medium 2000 and/or the logic circuit 600/700/800 in a single computing entity, such as entirely within a single device. The embodiments are not limited in this context.

Radio interface 3110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 3110 may include, for example, a receiver 3112, a transmitter 3116 and/or a frequency synthesizer 3114. Radio interface 3110 may include bias controls, a crystal oscillator and antennas 3118-1 to 3118-f. In another embodiment, radio interface 3110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 3120 may communicate with radio interface 3110 to process receive and/or transmit signals and may include, for example, an analog-to-digital converter 3122 for down converting received signals, a digital-to-analog converter 3124 for up converting signals for transmission. Further, baseband circuitry 3120 may include a baseband or physical layer (PHY) processing circuit 3126 for PHY link layer processing of respective receive/transmit signals. Baseband circuitry 3120 may include, for example, a processing circuit 3128 for medium access control (MAC)/data link layer processing. Baseband circuitry 3120 may include a memory controller 3132 for communicating with MAC processing circuit 3128 and/or a computing platform 3130, for example, via one or more interfaces 3134.

In some embodiments, PHY processing circuit 3126 may include a frame construction and/or detection module, in combination with additional circuitry such as a buffer memory, to construct and/or deconstruct communication frames (e.g., containing subframes). Alternatively, or in addition, MAC processing circuit 3128 may share processing for certain of these functions or perform these processes independent of PHY processing circuit 3126. In some embodiments, MAC and PHY processing may be integrated into a single circuit.

Computing platform 3130 may provide computing functionality for device 3000. As shown, computing platform 3130 may include a processing component 3140. In addition to, or alternatively of, baseband circuitry 3120 of device 3000 may execute processing operations or logic for the apparatus 100a, storage medium 2000, and logic circuits 600/1200 using the processing component 3130. Processing component 3140 (and/or PHY 3126 and/or MAC 3128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 3130 may further include other platform components 3150. Other platform components 3150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 3130 may further include a network interface 3160. In some examples, network interface 3160 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 3000 may be part of a device in a P2P network and may be included in various types of computing devices to include, but not limited to, user equipment, a computer, a personal computer (PC), a desktop computer, a laptop computer, a notebook computer, a netbook computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 2000 described herein; may be included or omitted in various embodiments of device 2000, as suitably desired. In some embodiments, device 2000 may be configured to be compatible with protocols and frequencies associated with IEEE 802.11 Standards or Specification and/or 3GPP Standards or Specifications for MIMO systems, although the examples are not limited in this respect.

The components and features of device 3000 may be implemented using any combination of discrete circuitry, application specific integrated circuits (ASICs), logic gates and/or single chip architectures. Further, the features of device 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 3000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
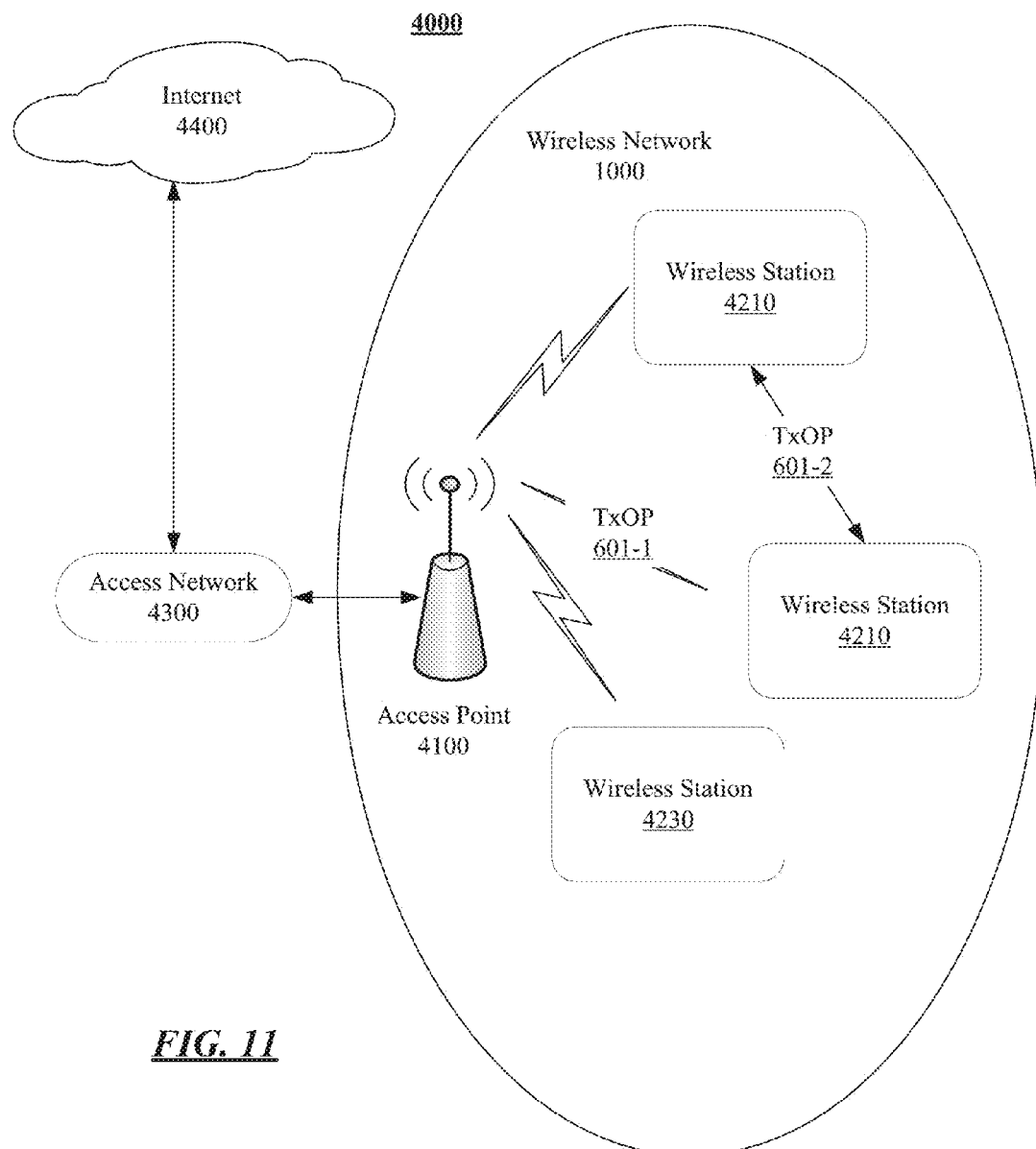
FIG. 11 illustrates one embodiment of a wireless network.

FIG. 11 illustrates an embodiment of a wireless network 4000. As shown in this figure, wireless network 4000 comprises an access point 4100 and wireless stations 4210, 4220, and 4230. In various embodiments, wireless network 4000 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 4000 may comprise another type of wireless network, and/or may implement other wireless communications standards. In various embodiments, for example, wireless network 4000 may comprise a WWAN or WPAN rather than a WLAN. The embodiments are not limited to this example.

In various embodiments, wireless stations 4210, 4220, and 4230 may communicate with access point 4100 in order to obtain connectivity to one or more external data networks. In some embodiments, for example, wireless stations 4210, 4220, and 4230 may connect to the Internet 4400 via access point 4100 and access network 4300. In various embodiments, access network 4300 may comprise a private network that provides subscription-based Internet-connectivity, such as an Internet Service Provider (ISP) network. The embodiments are not limited to this example.

In various embodiments, wireless stations 4210, 4220, 4230 and/or access point 4100 may communicate with each other by exchanging signals within a network (e.g., wireless network 1000).

Various examples described herein may be provided to enable one or more of the wireless stations (e.g., the station 4210) to establish a TxOP (e.g., the TxOP 600-1, 600-2, or the like) where an indication of the bandwidth is provided, while still providing support for legacy devices to receive and RTS and/or CTS frame to update NAV.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose might be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The disclosure now turns to providing example implementations. These examples re given for purposes of clarity and are not to be limiting.

EXAMPLE 1

An apparatus for a device in a wireless network, the apparatus comprising: circuitry; an encoder to be executed by the circuitry, the encoder to encode bandwidth information into a packet to communicate over a wireless network, the packet to include a parity byte portion, the encoder to encode the bandwidth information into the parity byte portion; and an interface to be executed by the circuitry, the interface to establish a transmit opportunity (TxOP) and to use channel bonding during the TxOP, the channel bonding based in part on the bandwidth information.

EXAMPLE 2

The apparatus of Example 1, comprising a radio operably coupled to the circuitry, the interface to establish the TxOP with a receiving device via the radio, the radio to send the packet to the receiving device as radio frequency signals.

EXAMPLE 3

The apparatus of Example 2, wherein the radio comprises a Wi-Fi radio.

EXAMPLE 4

The apparatus of Example 3, comprising an antenna operably coupled to the radio.

EXAMPLE 5

The apparatus of Example 3, comprising an antenna array operably coupled to the radio.

EXAMPLE 6

The apparatus of Example 1, the packet to include an indication of a request to send (RTS) frame or a clear to send (CTS) frame.

EXAMPLE 7

The apparatus of Example 1, the packet to include a physical layer (PHY) header, the parity byte portion to include a plurality of parity bytes corresponding to the PHY layer header.

EXAMPLE 8

The apparatus of Example 7, the encoder to encode the bandwidth information into a subset of the plurality of parity bytes.

EXAMPLE 9

The apparatus of Example 8, the encoder to encode the bandwidth information based in part on a Hadamard code or a Punctured Hadamard code.

EXAMPLE 10

The apparatus of Example 9, the PHY layer header to be encoded using a low-density parity-check (LDPC), the parity byte portion comprising 168 bits, the bandwidth information to be encoded using 16 bits of the 168 bits of the parity byte portion.

EXAMPLE 11

The apparatus of Example 1, the packet a first packet to include an indication of a request to send (RTS) frame, the bandwidth information first bandwidth information, the interface to receive a second packet from a receiving device, the second packet to include an indication of a clear to send (CTS) frame and an indication of second bandwidth information.

EXAMPLE 12

The apparatus of Example 1, the packet a first packet to include an indication of a clear to send (CTS) frame, the bandwidth information first bandwidth information, the interface to receive a second packet from a receiving device, the second packet to include an indication of a request to send (RTS) frame and an indication of second bandwidth information, the interface to send the first packet to the receiving device based on receiving the second packet.

EXAMPLE 13

The apparatus of any one of Examples 11 to 12, the interface to establish the TxOP with the receiving device using channel bonding based in part on the second bandwidth information.

EXAMPLE 14

The apparatus of any one of Examples 1 to 11, the circuitry to comprise an application processor or a baseband processor.

EXAMPLE 15

A method comprising: sending, via a radio, a first packet, the first packet to include a first parity byte portion, the first parity byte portion to include an indication of first bandwidth information; establishing, via the radio, a transmit opportunity (TxOP); and using channel bonding during the TxOP, the channel bonding based in part on the first bandwidth information.

EXAMPLE 16

The method of Example 15, the first packet to include an indication of a request to send (RTS) frame, the method comprising: receiving, via the radio, a second packet to include an indication of a clear to send (CTS) frame and a second parity byte portion, the second parity byte portion to include an indication of second bandwidth information, the second bandwidth information based in part on the first bandwidth information, wherein the channel bonding is based in part on the second bandwidth information.

EXAMPLE 17

The method of Example 15, the first packet to include an indication of a clear to send (CTS) frame, the method comprising: receiving, via the radio, a second packet to include an indication of a request to send (RTS) frame and a second parity byte portion, the second parity byte portion to include an indication of second bandwidth information, wherein the first packet is sent in response to receiving the second packet.

EXAMPLE 18

The method of any one of Examples 16 to 17, each of the first packet and the second packet to include a physical layer (PHY) header, the first parity byte portion to include a plurality of parity bytes corresponding to the PHY layer header of the first packet and the second parity byte portion to include a plurality of parity bytes corresponding to the PHY layer header of the second packet.

EXAMPLE 19

The method of Example 18, comprising generating the first packet to include the indication of the first bandwidth in a subset of the plurality of the first parity bytes.

EXAMPLE 20

The method of Example 19, comprising encoding the first bandwidth based in part on a Hadamard code or a Punctured Hadamard code.

EXAMPLE 21

The method of Example 20, the PHY layer header of at least the first packet to be encoded using a low-density parity-check (LDPC), the first parity byte portion comprising 168 bits, the first bandwidth information to be encoded using 16 bits of the 168 bits of the first parity byte portion.

EXAMPLE 22

The method of Example 18, comprising generating the second packet to include the indication of the second bandwidth in a subset of the plurality of the second parity bytes.

EXAMPLE 23

The method of Example 22, comprising encoding the second bandwidth based in part on a Hadamard code or a Punctured Hadamard code.

EXAMPLE 24

The method of Example 23, the PHY layer header of at least the second packet to be encoded using a low-density parity-check (LDPC), the second parity byte portion comprising 168 bits, the second bandwidth information to be encoded using 16 bits of the 168 bits of the second parity byte portion.

EXAMPLE 25

An apparatus for a device in a wireless network, the apparatus comprising means to perform the method of any of Examples 15 to 25.

EXAMPLE 26

An apparatus for a wireless network comprising: a processor; a radio operably connected to the processor; one or more antennas operably connected to the radio to transmit or receive wireless signals; and a memory comprising a plurality of instructions that in response to being executed by the processor cause the processor or the radio to perform the method of any of Examples 15 to 25.

EXAMPLE 27

At least one machine readable medium comprising a plurality of instructions that in response to being executed by circuitry on a wireless device causes the wireless device to: send, via a radio, a first packet, the first packet to include a first parity byte portion, the first parity byte portion to include an indication of first bandwidth information; establish, via the radio, a transmit opportunity (TxOP); and use channel bonding during the TxOP, the channel bonding based in part on the first bandwidth information.

EXAMPLE 28

The at least one machine readable medium of Example 27, the first packet to include an indication of a request to send (RTS) frame, the plurality of instructions that in response to being executed by circuitry on the wireless device cause the wireless device to receive, via the radio, a second packet to include an indication of a clear to send (CTS) frame and a second parity byte portion, the second parity byte portion to include an indication of second bandwidth information, the second bandwidth information based in part on the first bandwidth information, wherein the channel bonding is based in part on the second bandwidth information.

EXAMPLE 29

The at least one machine readable medium of Example 27, the first packet to include an indication of a clear to send (CTS) frame, the plurality of instructions that in response to being executed by circuitry on the wireless device cause the wireless device to receive, via the radio, a second packet to include an indication of a request to send (RTS) frame and a second parity byte portion, the second parity byte portion to include an indication of second bandwidth information, wherein the first packet is sent in response to receiving the second packet.

EXAMPLE 30

The at least one machine readable medium of any one of Examples 28 to 29, each of the first packet and the second packet to include a physical layer (PHY) header, the first parity byte portion to include a plurality of parity bytes corresponding to the PHY layer header of the first packet and the second parity byte portion to include a plurality of parity bytes corresponding to the PHY layer header of the second packet.

EXAMPLE 31

The at least one machine readable medium of Example 30, the plurality of instructions that in response to being executed by circuitry on the wireless device cause the wireless device to generate the first packet to include the indication of the first bandwidth in a subset of the plurality of the first parity bytes.

EXAMPLE 32

The at least one machine readable medium of Example 31, the plurality of instructions that in response to being executed by circuitry on the wireless device cause the wireless device to encode the first bandwidth based in part on a Hadamard code or a Punctured Hadamard code.

EXAMPLE 33

The at least one machine readable medium of Example 32, the PHY layer header of at least the first packet to be encoded using a low-density parity-check (LDPC), the first parity byte portion comprising 168 bits, the first bandwidth information to be encoded using 16 bits of the 168 bits of the first parity byte portion.

EXAMPLE 34

The at least one machine readable medium of Example 30, the plurality of instructions that in response to being executed by circuitry on the wireless device cause the wireless device to generate the second packet to include the indication of the second bandwidth in a subset of the plurality of the second parity bytes.

EXAMPLE 35

The at least one machine readable medium of Example 34, the plurality of instructions that in response to being executed by circuitry on the wireless device cause the wireless device to encode the second bandwidth based in part on a Hadamard code or a Punctured Hadamard code.

EXAMPLE 36

The at least one machine readable medium of Example 35, the PHY layer header of at least the second packet to be encoded using a low-density parity-check (LDPC), the second parity byte portion comprising 168 bits, the second bandwidth information to be encoded using 16 bits of the 168 bits of the second parity byte portion.

What is claimed is:

1. An apparatus for a device in a wireless network, the apparatus comprising:
   circuitry;
     an encoder to be executed by the circuitry, the encoder to encode bandwidth information into a packet to communicate over a wireless network, the packet to include a physical layer (PHY) header and a parity byte portion, the parity byte portion to include a plurality of parity bytes corresponding to the PHY header, the encoder to encode the bandwidth information into the parity byte portion; and
     an interface to be executed by the circuitry, the interface to establish a transmit opportunity (TxOP) and to use channel bonding during the TxOP, the channel bonding based in part on the bandwidth information.

2. The apparatus of claim 1, comprising a radio operably coupled to the circuitry, the interface to establish the TxOP with a receiving device via the radio, the radio to send the packet to the receiving device as radio frequency signals.

3. The apparatus of claim 2, wherein the radio comprises a Wi-Fi radio.

4. The apparatus of claim 3, comprising at least one of an antenna or an antenna array, the antenna or antenna array operably coupled to the radio.

5. The apparatus of claim 1, the packet to include an indication of a request to send (RTS) frame or a clear to send (CTS) frame.

6. The apparatus of claim 1, the encoder to encode the bandwidth information into a subset of the plurality of parity bytes.

7. The apparatus of claim 6, the encoder to encode the bandwidth information based in part on a Hadamard code or a Punctured Hadamard code.

8. The apparatus of claim 7, the PHY header to be encoded using a low-density parity-check (LDPC), the parity byte portion comprising 168 bits, the bandwidth information to be encoded using 16 bits of the 168 bits of the parity byte portion.

9. The apparatus of claim 1, the packet to include an indication of a request to send (RTS) frame, the interface to receive a second packet from a receiving device, the second packet to include an indication of a clear to send (CTS) frame and an indication of second bandwidth information.

10. The apparatus of claim 1, the packet to include an indication of a clear to send (CTS) frame, the interface to receive a second packet from a receiving device, the second packet to include an indication of a request to send (RTS) frame and an indication of second bandwidth information, the interface to send the packet to the receiving device based on receiving the second packet.

11. The apparatus of claim 10, the interface to establish the TxOP with the receiving device using channel bonding based in part on the second bandwidth information.

12. The apparatus of any claim 1, the circuitry to comprise an application processor or a baseband processor.

13. A method comprising:
     sending, via a radio, a first packet including a physical layer (PHY) header, the first packet to include a first parity byte portion including a plurality of parity bytes corresponding to the PHY header, the first parity byte portion to include an indication of first bandwidth information;
     establishing, via the radio, a transmit opportunity (TxOP); and
     using channel bonding during the TxOP, the channel bonding based in part on the first bandwidth information.

14. The method of claim 13, the first packet to include an indication of a request to send (RTS) frame, the method comprising receiving, via the radio, a second packet to include an indication of a clear to send (CTS) frame and a second parity byte portion, the second parity byte portion to include an indication of second bandwidth information, the second bandwidth information based in part on the first bandwidth information, wherein the channel bonding is based in part on the second bandwidth information.

15. The method of claim 14, the second packet to include a PHY header, the second parity byte portion to include a plurality of parity bytes corresponding to the PHY header of the second packet.

16. The method of claim 15, comprising generating the first packet to include the indication of the first bandwidth in a subset of the plurality of the first parity bytes.

17. The method of claim 16 comprising encoding the first bandwidth based in part on a Hadamard code or a Punctured Hadamard code.

18. The method of claim 17, the PHY header of at least the first packet to be encoded using a low-density parity-check (LDPC), the first parity byte portion comprising 168 bits, the first bandwidth information to be encoded using 16 bits of the 168 bits of the first parity byte portion.

19. At least one machine readable medium comprising a plurality of instructions that in response to being executed by circuitry on a wireless device causes the wireless device to:

send, via a radio, a first packet including a physical layer (PHY) header, the first packet to include a first parity byte portion including a plurality of parity bytes corresponding to the PHY header, the first parity byte portion to include an indication of first bandwidth information;

establish, via the radio, a transmit opportunity (TxOP); and use channel bonding during the TxOP, the channel bonding based in part on the first bandwidth information.

20. The at least one machine readable medium of claim 19, the first packet to include an indication of a request to send (RTS) frame, the plurality of instructions that in response to being executed by circuitry on the wireless device cause the wireless device to receive, via the radio, a second packet to include an indication of a clear to send (CTS) frame and a second parity byte portion, the second parity byte portion to include an indication of second bandwidth information, the second bandwidth information based in part on the first bandwidth information, wherein the channel bonding is based in part on the second bandwidth information.

21. The at least one machine readable medium of claim 19, the first packet to include an indication of a clear to send (CTS) frame, the plurality of instructions that in response to being executed by circuitry on the wireless device cause the wireless device to receive, via the radio, a second packet to include an indication of a request to send (RTS) frame and a second parity byte portion, the second parity byte portion to include an indication of second bandwidth information, wherein the first packet is sent in response to receiving the second packet.

22. The at least one machine readable medium of claim 21, the second packet to include a PHY header, the second parity byte portion to include a plurality of parity bytes corresponding to the PHY header of the second packet.

23. The at least one machine readable medium of claim 22, the plurality of instructions that in response to being executed by circuitry on the wireless device cause the wireless device to generate the second packet to include the indication of the second bandwidth in a subset of the plurality of the second parity bytes.

24. The at least one machine readable medium of claim 23, the plurality of instructions that in response to being executed by circuitry on the wireless device cause the wireless device to encode the second bandwidth based in part on a Hadamard code or a Punctured Hadamard code, the PHY header of at least the second packet to be encoded using a low-density parity-check (LDPC), the second parity byte portion comprising 168 bits, the second bandwidth information to be encoded using 16 bits of the 168 bits of the second parity byte portion.

* * * * *